United States Patent [19]

Kim et al.

[11] Patent Number: 5,793,830
[45] Date of Patent: Aug. 11, 1998

[54] METAL ALLOY COATING FOR MITIGATION OF STRESS CORROSION CRACKING OF METAL COMPONENTS IN HIGH-TEMPERATURE WATER

[75] Inventors: Young Jin Kim, Clifton Park; Peter Louis Andresen, Schenectady, both of N.Y.; Robert Lee Cowan, II, Livermore, Calif.

[73] Assignee: General Electric Company, Schenectady, N.Y.

[21] Appl. No.: 498,029

[22] Filed: Jul. 3, 1995

[51] Int. Cl.[6] .................................................. G21C 9/00
[52] U.S. Cl. ............................ 376/305; 376/306; 422/11; 422/14; 422/19
[58] Field of Search .......................... 376/300, 301, 376/305, 306, 457; 148/579, 668, 669, 672, 674, 675; 420/422, 125–127, 438, 447; 427/236, 237, 239, 405; 428/627, 632, 638, 660; 422/11, 14, 19

[56] References Cited

U.S. PATENT DOCUMENTS

| | | | |
|---|---|---|---|
| 4,267,210 | 5/1981 | Yajima et al. | 427/226 |
| 4,284,660 | 8/1981 | Donaghy et al. | 427/239 X |
| 4,672,007 | 6/1987 | Teng et al. | 428/632 X |
| 4,718,949 | 1/1988 | Takase et al. | 148/672 |
| 4,877,705 | 10/1989 | Polidor | 428/34.6 |
| 4,992,240 | 2/1991 | Komatsu et al. | 420/422 |
| 5,130,080 | 7/1992 | Niedrach | 376/305 |
| 5,130,081 | 7/1992 | Niedrach | 376/305 |
| 5,135,709 | 8/1992 | Andresen et al. | 376/305 |
| 5,147,602 | 9/1992 | Andresen et al. | 420/35 |
| 5,287,392 | 2/1994 | Cowan, II et al. | 376/301 |
| 5,581,588 | 12/1996 | Andresen | 376/305 |
| 5,600,691 | 2/1997 | Hettiarachchi et al. | 376/305 |
| 5,602,888 | 2/1997 | Hettiarachchi et al. | 376/305 |
| 5,608,766 | 3/1997 | Andresen et al. | 376/305 |

FOREIGN PATENT DOCUMENTS

| | | |
|---|---|---|
| 0508758 | 10/1992 | European Pat. Off. . |
| 2059672 | 6/1972 | Germany . |
| 121959 | 9/1976 | Germany . |

Primary Examiner—Charles T. Jordan
Assistant Examiner—Matthew J. Lattig
Attorney, Agent, or Firm—Ernest G. Cusick; Noreen C. Johnson

[57] ABSTRACT

A method for mitigating crack initiation and propagation on the surface of metal components in a water-cooled nuclear reactor. A metal coating having an electrically insulating outer layer is applied on the surfaces of IGSCC-susceptible reactor components. The preferred metal coating is a zirconium alloy with a zirconia outer layer. The presence of an electrically insulating layer on the surface of the metal components shifts the corrosion potential in the negative direction without the addition of hydrogen and in the absence of a noble metal catalyst. Corrosion potentials $\leq -0.5\ V_{SHE}$ can be achieved even at high oxidant concentrations and in the absence of hydrogen.

25 Claims, 10 Drawing Sheets

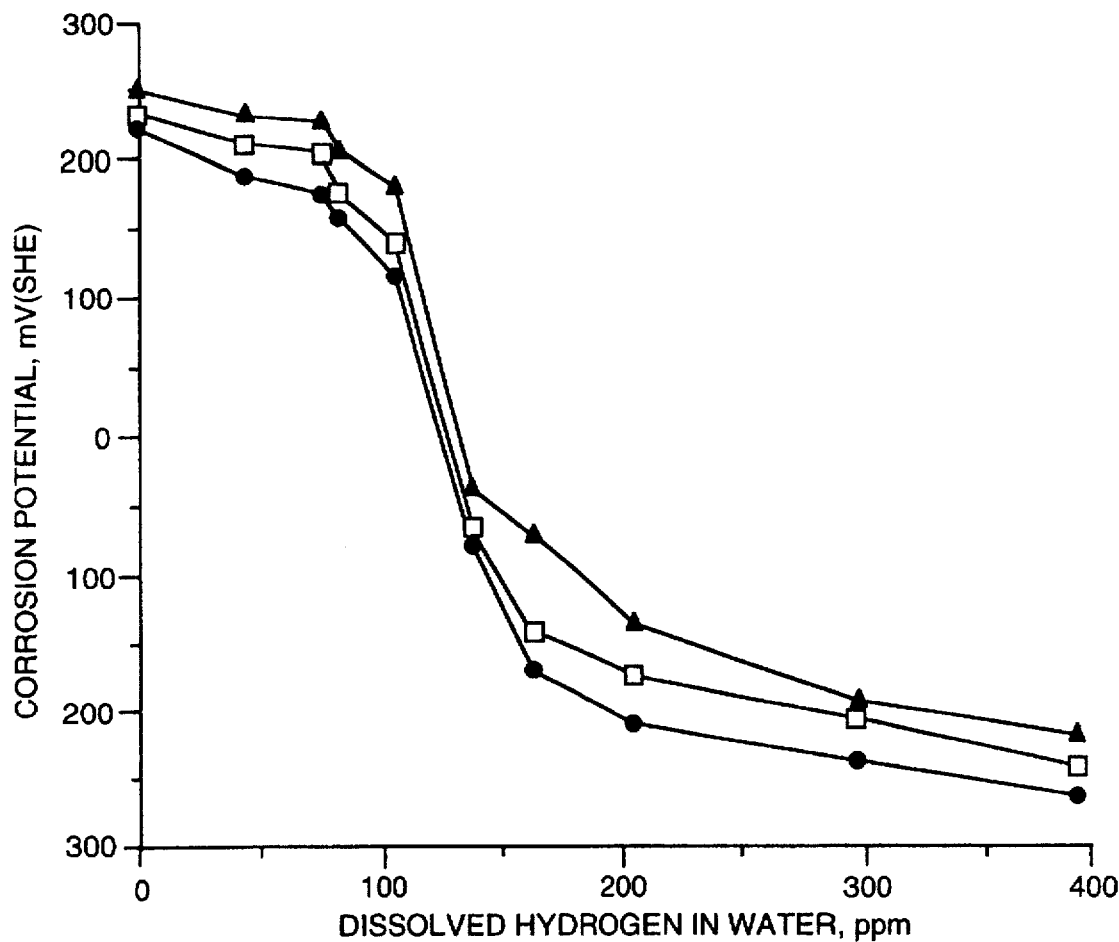
FIG. 7
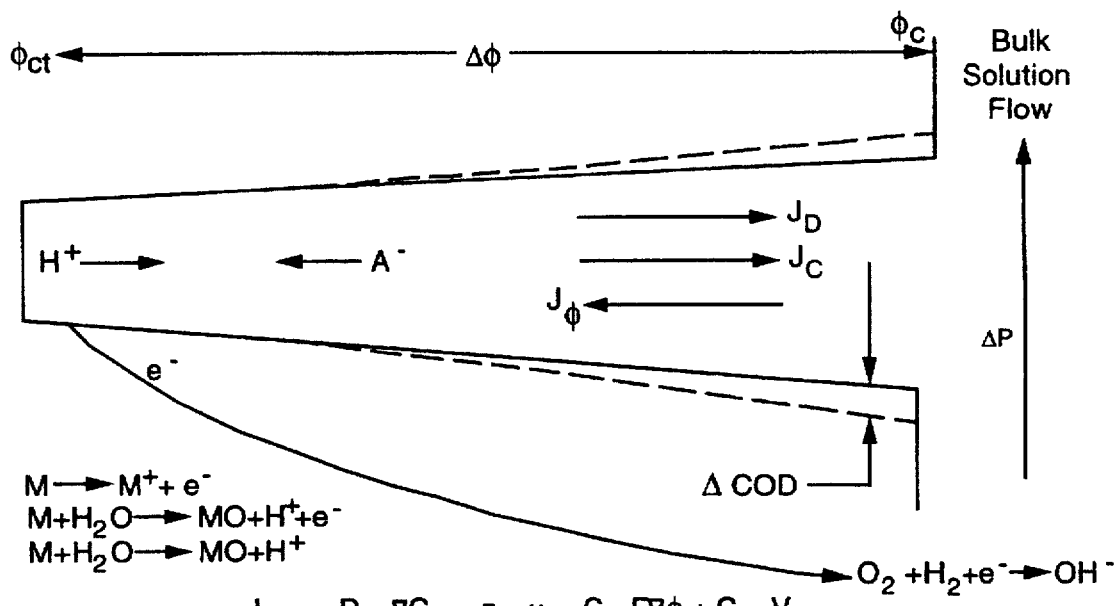
FIG. 8   $J_{A^-} = -D_A \cdot \nabla C_A - z_A \cdot \mu_A \cdot C_A \cdot F \nabla \phi + C_A \cdot V$
Where $V = f(\Delta P, \Delta COD)$

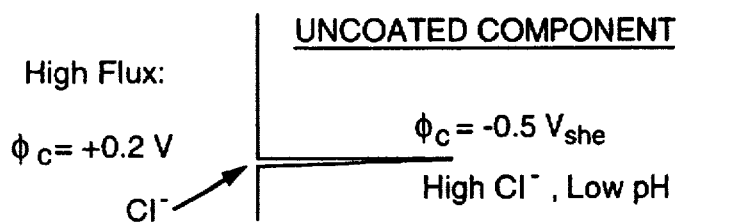
FIG. 9A
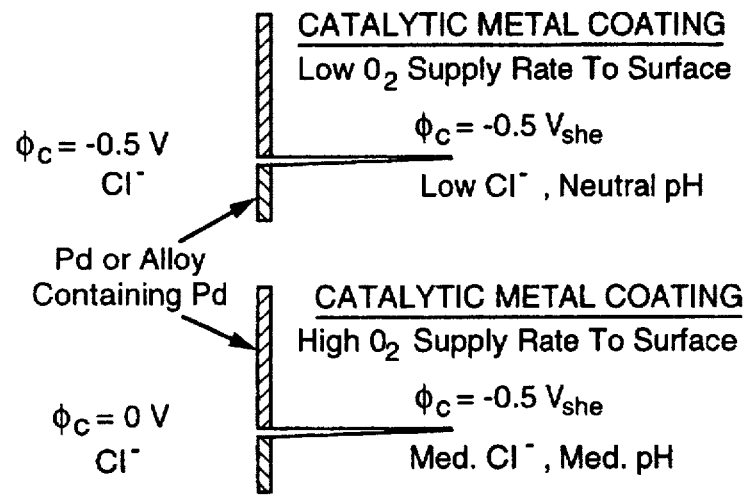
FIG. 9B
FIG. 9C
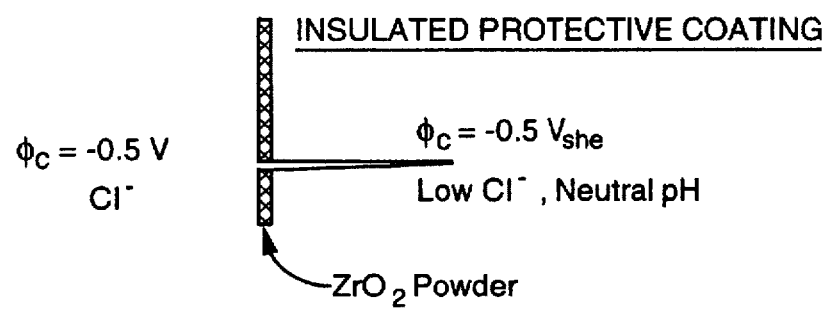
FIG. 9D
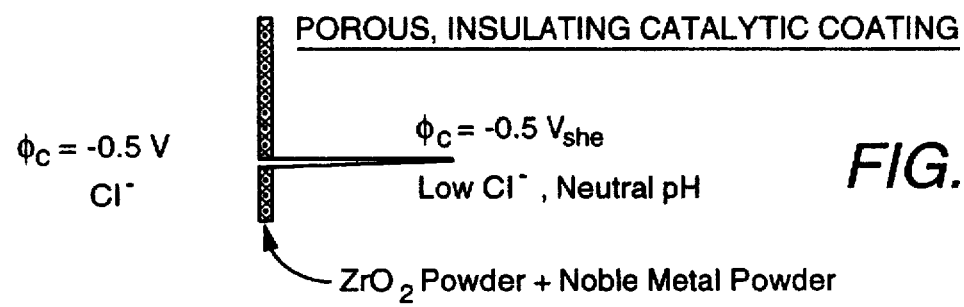
FIG. 9E
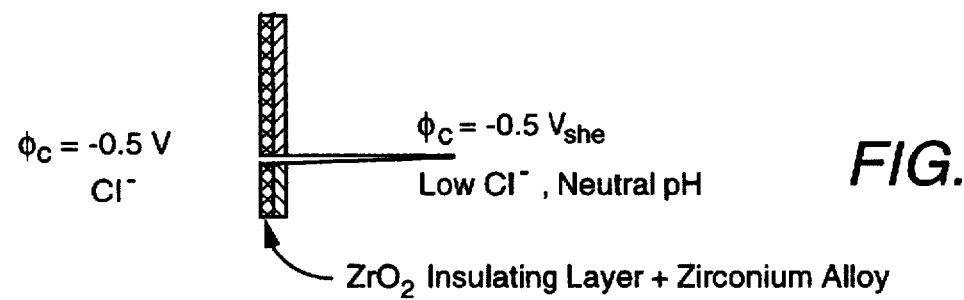
FIG. 9F ରି
METAL ALLOY COATING FOR MITIGATION OF STRESS CORROSION CRACKING OF METAL COMPONENTS IN HIGH-TEMPERATURE WATER

FIELD OF THE INVENTION

This invention relates to reducing the corrosion potential of components exposed to high-temperature water by the use of protective metal alloy coatings. This invention is particularly related to the use of metal alloys that may be adapted to form outer insulating layers that are adherent and insoluble in high temperature water as coatings to lower the corrosion potential of a metal component in such water.

BACKGROUND OF THE INVENTION

As used herein, the term "high-temperature water" means water having a temperature of about 100° C. or greater, steam, or the condensate thereof. High-temperature water is found in a variety of known apparatus, such as water deaerators, nuclear reactors, and steam-driven power plants. High temperature water may have elevated concentration of oxidizing species such as hydrogen peroxide and oxygen.

Nuclear reactors are used in electric power generation, research and propulsion. A typical nuclear reactor comprises a reactor pressure vessel contains the reactor coolant, i.e. high temperature water, which removes heat from the nuclear core. Respective piping circuits carry heated water or steam to the steam generators or turbines and carry circulated water or feedwater back to the vessel. Operating pressures and temperatures for the reactor pressure vessel are about 7 MPa and 288° C. for a boiling water reactor (BWR), and about 15 MPa and 320° C. for a pressurized water reactor (PWR). Much of a nuclear reactor is fabricated from metal components comprising various materials. The materials used in both BWRs and PWRs must withstand various loading, environmental and radiation conditions, including exposure to high temperature water.

Some of the materials exposed to high-temperature water include carbon steel, alloy steel, stainless steel and other iron-base alloys, as well as nickel-base, cobalt-base and zirconium-base alloys. Despite careful selection and treatment of these materials for use in water reactors, corrosion occurs on these materials when exposed to the high-temperature water. Such corrosion contributes to a variety of problems, for example, stress corrosion cracking, crevice corrosion, erosion corrosion, sticking of pressure relief valves and buildup of the gamma radiation-emitting Co-60 isotope.

Stress corrosion cracking (SCC) is a known phenomenon occurring in metal reactor components, such as structural members, piping, fasteners and welds that are exposed to high-temperature water. As used herein, SCC refers to cracking propagated by static or dynamic tensile stressing in combination with corrosion at the crack tip. The metal components of a reactor are subject to a variety of stresses associated with, for example, differences in thermal expansion, the operating pressure needed for the containment of the reactor cooling water, and other sources such as residual stress from welding, cold working and other asymmetric metal treatments. In addition, water chemistry, welding, crevice geometry, heat treatment, and radiation can increase the susceptibility of a metal component to SCC.

It is well known that SCC occurs at higher rates when oxygen is present in the reactor water in concentrations of about 1 to 5 parts per billion (ppb) or greater. SCC is further increased in components exposed to a high radiation flux where oxidizing species, such as oxygen, hydrogen peroxide, and short-lived radicals, are produced from radiolytic decomposition of the reactor cooling water. Such oxidizing species increase the electrochemical corrosion potential (ECP) of metals. Electrochemical corrosion is caused by a flow of electrons from anodic to cathodic areas on metallic surfaces. The ECP is a measure of the thermodynamic tendency for corrosion phenomena to occur, and is a fundamental parameter in determining rates of various corrosion phenomena, including SCC, corrosion fatigue, corrosion film thickening, and general corrosion.

The ECP has been clearly shown to be a primary variable in controlling the susceptibility to SCC in BWR environments. FIG. 1 shows the observed (data points) and predicted (curves) crack growth rate as a function of corrosion potential for 25 mm CT specimens of furnace-sensitized Type 304 stainless steel at 27.5 to 30 MPa√m constant load in 288° C. water over the range of solution conductivities from 0.1 to 0.5 µS/cm. Data points at elevated corrosion potentials and growth rates correspond to actual irradiated water chemistry conditions in test or commercial reactors.

Corrosion (or mixed) potential represents a kinetic balance of various oxidation and reduction reactions on a metal surface placed in an electrolyte, and can be decreased by reducing the concentration of oxidants such as dissolved oxygen. FIG. 2 is a schematic of E (potential) vs. log |i| (absolute value of current density) curves showing the interaction of $H_2$ and $O_2$ on a catalytically active surface such as platinum or palladium. The terms $i_o$ prepresents the exchange current densities, which are a measure of the reversibility of the reactions. Above $i_o$, activation polarization (Tafel behavior) is shown in the sloped, linear regions. The terms $i_L$ represent the limited current densities for oxygen diffusion to the metal surface, which vary with mass transport rate (e.g., oxygen concentration, temperature, and convection). The corrosion potential in high-temperature water containing oxygen and hydrogen is usually controlled by the intersection of the $O_2$ reduction curve ($O_2+2H_2O+4e^-\rightarrow 4OH^-$) with the $H_2$ oxidation curve ($H_2\rightarrow 2H^++2e^-$), with the low kinetics of metal dissolution generally having only a small role.

The fundamental importance of corrosion potential versus, for example, the dissolved oxygen concentration per se, is shown in FIG. 3, where the crack growth rate of a Pd-coated CT specimen drops dramatically once excess hydrogen conditions are achieved, despite the presence of a relatively high oxygen concentration. FIG. 3 is a plot of crack length vs. time for a Pd-coated CT specimen of sensitized Type 304 stainless steel showing accelerated crack growth at ≈0.1 µM $H_2SO_4$ in 288° C. water containing about 400 ppb oxygen. Because the CT specimen was Pd-coated, the change to excess hydrogen caused the corrosion potential and crack growth rate to drop.

In a BWR, the radiolysis of the primary water coolant in the reactor core causes the net decomposition of a small fraction of the water to the chemical products $H_2$, $H_2O_2$, $O_2$ and other oxidizing and reducing radicals. For steady-state operating conditions, approximately equilibrium concentrations are established for $O_2$, $H_2O_2$, and $H_2$ in the water which is recirculated and for $O_2$ and $H_2$ in the steam going to the turbine. The resultant concentrations of $O_2$, $H_2O_2$, and $H_2$ produce an oxidizing environment and result in conditions that can promote intergranular stress corrosion cracking (IGSCC) of susceptible materials of construction.

One well-known method employed to mitigate IGSCC of susceptible material is the application of hydrogen water chemistry (HWC), whereby the oxidizing nature of the BWR environment is modified to a more reducing condition. This effect is achieved by adding hydrogen gas to the reactor feedwater. When the hydrogen reaches the reactor vessel, it reacts with the radiolytically formed oxidizing species homogeneously and on metal surfaces to re-form water, thereby lowering the concentration of dissolved oxidizing species in the bulk water, including that portion of the water that is adjacent to metal surfaces. The rate of these recombination reactions is dependent on local radiation fields, water flow rates and other variables.

In HWC, the injected hydrogen reduces the level of oxidizing species in the water, such as dissolved oxygen, and as a result lowers the ECP of metals in the water. However, factors such as variations in water flow rates and the time or intensity of exposure to neutron or gamma radiation result in different concentrations of the stated oxidizing species in different reactors, and different concentrations at different locations within the same reactor. Thus, varying amounts of hydrogen have been required to reduce the level of oxidizing species sufficiently to maintain the ECP below a critical potential required for protection of metal reactor components from IGSCC in high-temperature water. As used herein, the term "critical potential" means a corrosion potential at or below a range of values of about −0.230 to −0.300 V based on the standard hydrogen electrode (SHE) scale. IGSCC proceeds at an accelerated rate in systems in which the ECP is above the critical potential, and at a substantially lower rate, or effectively at a zero rate, in systems in which the ECP is below the critical potential (see FIG. 1). Water containing oxidizing species such as oxygen increases the ECP of metals exposed to the water above the critical potential, whereas water with little or no oxidizing species present results in an ECP below the critical potential. Initial use of HWC focused on relatively large additions of dissolved hydrogen, which proved capable of reducing the dissolved oxygen concentration in the water outside of the core from ≈200 ppb to <5 ppb, with a resulting change in corrosion potential from ≈+0.05 $V_{SHE}$ to ≦−0.25 $V_{SHE}$. This approach is in commercial use in both domestic and foreign BWRs. Corrosion potentials of stainless steels and other structural materials in contact with reactor water containing oxidizing species can usually be reduced below the critical potential by the use of HWC through injection of hydrogen into the reactor feedwater. For adequate feedwater hydrogen addition rates, conditions necessary to inhibit IGSCC can be established in certain locations of the reactor. Different locations in the reactor system require different levels of hydrogen addition. Much higher hydrogen injection levels are necessary to reduce the ECP within the high radiation flux of the reactor core, or when oxidizing cationic impurities, for example, cupric ion, are present.

It has been shown that IGSCC of Type 304 stainless steel (containing 18–20% Cr, 8–10.5% Ni and 2% Mn) and all other structural materials commonly used in BWRs can be mitigated effectively by reducing the ECP of the material to values below −0.230 $V_{SHE}$. An effective method of achieving this objective is to use HWC. However, high hydrogen additions, for example, of about 200 ppb or greater in the water of the reactor core, that may be required to reduce the ECP below the critical potential, can result in a higher radiation level in the steam-driven turbine section from incorporation of the short-lived $N^{16}$ species in the steam. For most BWRs, the amount of hydrogen addition required to provide mitigation of IGSCC of pressure vessel internal components results in an increase in the main steam line radiation monitor by a factor of five to eight. This increase in main steam line radiation can cause high, even unacceptable, environmental dose rates that can require expensive investments in shielding and radiation exposure control. Thus, recent investigations have focused on using minimum levels of hydrogen to achieve the benefits of HWC with minimum increase in the main steam radiation dose rates. In this context, it is important to recognize that significant mitigation of IGSCC can also occur when the corrosion potential is greater than −0.230 $V_{SHE}$, such as when the corrosion potential is lowered by as little as 0.050 $V_{SHE}$. Referring to FIG. 1, a reduction of 0.050 $V_{SHE}$, for example, from −0.100 $V_{SHE}$ to −0.150 $V_{SHE}$ results in a reduction of the crack growth rate, at solution conductivities of 0.1–0.5 μS/cm, by a factor of approximately two.

Another effective approach used to reduce the ECP is to either coat or alloy the stainless steel surface with palladium or other noble metals. The presence of palladium on the stainless steel surface reduces the amount of hydrogen required to reach the required IGSCC critical potential of −0.230 $V_{SHE}$. The use of alloys or metal coatings containing noble metals permits lower corrosion potentials (e.g., ≈−0.5 $V_{SHE}$) to be achieved at much lower hydrogen addition rates. For example, U.S. Pat. No. 5,135,709 (Andresen et al.) discloses a method for lowering the ECP on components formed from carbon steel, alloy steel, stainless steel and other iron-base alloys, as well as nickel-base alloys or cobalt-base alloys which are exposed to high-temperature water by forming the component to have a catalytic layer of a noble metal. Such approaches rely on the very efficient recombination kinetics of dissolved oxygen and hydrogen on catalytic surfaces (see the high $i_0$ for $H_2$ oxidation in FIG. 2, which causes most $O_2$ reduction curves to intersect at −0.5 $V_{SHE}$). This was demonstrated not only for pure noble metals and coatings, but also for very dilute alloys or metal coatings containing, for example, <0.1 wt. % Pt or Pd (see FIGS. 3 to 5). FIG. 4 shows corrosion potential measurements on pure platinum, Type 304 stainless steel and Type 304 stainless steel thermally sprayed by the hyper-velocity oxy-fuel (HVOF) technique with a powder of Type 308L stainless steel containing 0.1 wt. % palladium. Data were obtained in 285° C. water containing 200 ppb oxygen and varying amounts of hydrogen. The potential drops dramatically to its thermodynamic limit of ≈−0.5 $V_{SHE}$ once the hydrogen is near or above the stoichiometric value associated with recombination with oxygen to form water ($2H_2$+ $O_2 \rightarrow 2H_2O$). FIG. 5 shows corrosion potentials of Type 304 stainless steel doped with 0.35 wt. % palladium at a flow rate of 200 cc/min. in 288° C. water containing up to 5000 ppb oxygen and various amounts of hydrogen.

If the surface recombination rate is much higher than the rate of supply of oxidants to the metal surface (through the stagnant, near-surface boundary layer of water), then the concentration of oxidants (at the surface) becomes very low and the corrosion potential drops to its thermodynamic limit of ≈−0.5 $V_{SHE}$ in 288° C. water, even though the bulk concentration of dissolved oxygen remains high (FIGS. 3 to 5). Further, the somewhat higher diffusion rate of dissolved hydrogen versus dissolved oxygen through the boundary layer of water permits somewhat substoichiometric bulk concentrations of hydrogen to support full recombination of the oxidant which arrives at the metal surface. While some hydrogen addition to BWRs will still be necessary with this approach, the addition can be vastly lower, as low as ≦1% of that required for the initial HWC concept. Hydrogen additions remain necessary since, while oxidants (primarily oxygen and hydrogen peroxide) and reductants (primarily hydrogen) are produced by radiolysis in stoichiometric balance, hydrogen preferentially partitions to the steam phase in a BWR. Also, no hydrogen peroxide goes into the steam. Thus, in BWR recirculation water there is some excess of oxygen relative to hydrogen, and then, in addition, a fairly large concentration of hydrogen peroxide (e.g., ≈200 ppb). Approaches designed to catalytically decompose the hydrogen peroxide before or during steam separation (above the core) have also been identified.

While the noble metal approach works very well under many conditions, both laboratory data and in-core measurements on noble metals show that it is possible for the oxidant supply rate to the metal surface to approach and/or exceed the recombination rate (see FIGS. 6 and 7). FIG. 6 shows the effect of feedwater hydrogen addition on the corrosion potential of stainless steel and platinum at several locations at the Duane Arnold BWR located in Palo, Iowa. At ≈2 SCFM of feedwater hydrogen addition, the corrosion potentials in the recirculation piping drop below ≈−0.25 $V_{SHE}$. However, in the high flux (top of core) regions, even for pure Pt, the corrosion potential remains above ≈−0.25 $V_{SHE}$ at feedwater hydrogen levels of ≧15 SCFM, where long-term operation is very unattractive due to the cost of hydrogen and the increase in volatile $N^{16}$ (turbine shine). FIG. 7 shows corrosion potential vs. hydrogen addition for Pd-coated Type 316 stainless steel in 288° C. water in a rotating cylinder specimen, which simulates high fluid flow rate conditions. The water contained 1.0 part per million (ppm) $O_2$. As the hydrogen level was increased above stoichiometry, the potential decreased, but only to about −0.20 $V_{SHE}$. The oxygen supply rate in these tests had exceeded the exchange current density ($i_o$) of the hydrogen reaction (see FIG. 2), and activation polarization (Tafel response) of the hydrogen reaction began to occur, causing a shift to a mixed (or corrosion) potential which is in between the potentials measured in normal and extreme hydrogen water chemistry on non-catalytic surfaces.

At the point where the oxidant supply rate to the metal surface approaches and/or exceeds the recombination rate, the corrosion potential will rapidly increase by several hundred millivolts (e.g., to ≧−0.2 $V_{SHE}$). Indeed, even under (relatively small) excess hydrogen conditions, pure platinum electrodes in the core of BWRs exhibit corrosion potentials which are quite high, although still somewhat lower than (non-catalytic) stainless steel (see FIG. 6). At very high hydrogen levels (well above those typically used in the original hydrogen water chemistry concept), the corrosion potential on noble metal surfaces will drop to <−0.3 $V_{SHE}$ (see FIG. 6). However, the huge cost of the hydrogen additions combined with large observed increase in volatile radioactive nitrogen in the steam (i.e., $N^{16}$, which can raise the radiation levels in the turbine building) make the use of very high hydrogen addition rates unpalatable.

Therefore, it is desirable to develop other means for lowering the ECP of metal components in high temperature water in addition to HWC and catalytic coatings or alloys, particularly means that may overcome some or all of the limitations of these methods of lowering the ECP.

SUMMARY OF THE INVENTION

The present invention is directed toward lowering the ECP of stainless steel and other metal alloys used in high temperature water environments that contain oxidant species such as hydrogen peroxide and dissolved oxygen. This is accomplished by coating the surfaces of IGSCC-susceptible reactor components with a metal alloy that has an electrically insulating outer layer that is adherent and insoluble in high temperature water. In accordance with the present invention, the metal components ECP is shifted in the negative direction without the addition of hydrogen.

The present invention may be described as a method for mitigating stress corrosion cracking of a metal component adapted for use in high temperature water, comprising the steps of: selecting a metal component having a surface and adapted for use in a system where the surface is exposed to high temperature water, wherein the surface has a corrosion potential and is susceptible to stress corrosion cracking when exposed to high-temperature water; applying a coating of a metal alloy to the surface of the metal component; and forming an insulating layer on an outer surface of the metal alloy that is adherent and insoluble in high temperature water, whereby the metal component with the insulating layer has a corrosion potential that is at least 0.050 V lower than the corrosion potential of the surface of the uncoated metal component in high temperature water.

One object of the present invention is to lower the ECP of metal components used in high temperature water environments without the addition of hydrogen. Another object of this invention is to lower the ECP of these components below a critical potential without the addition of hydrogen. Another object is to develop adherent, self-passivating coatings that are insoluble in high temperature water.

A significant advantage of the present invention is that it achieves the objects described, while also offering several other advantages, including: allowing flexibility of the methods used to apply the metal alloy coatings (i.e. thermal spraying, cladding), the ability to apply the metal alloy coating to individual components prior to incorporation into a system or in situ in a system containing high-temperature water, and the likelihood that coatings of the present invention will exhibit improved resistance to mechanical damage as compared to insulating coatings (i.e. zirconia).

BRIEF DESCRIPTION OF THE DRAWINGS

FIG. 7 is a graph showing corrosion potential vs. hydrogen addition for Pd-coated Type 316 stainless steel in 288°

C. water in a rotating cylinder specimen, which simulates high fluid flow rate conditions of 0.3 (●), 1.5 (□) and 3.0 (▲) m/sec.

FIG. 8 is a schematic of electrochemical processes which generally lead to elevated corrosion potentials on the outside (mouth) of a crack and low corrosion potentials in the inside (tip) of the crack.

FIGS. 9A to 9F provide a schematic comparison of the corrosion potentials $\phi_c$ which form under high radiation flux on various coated and uncoated components.

Figure 10A:
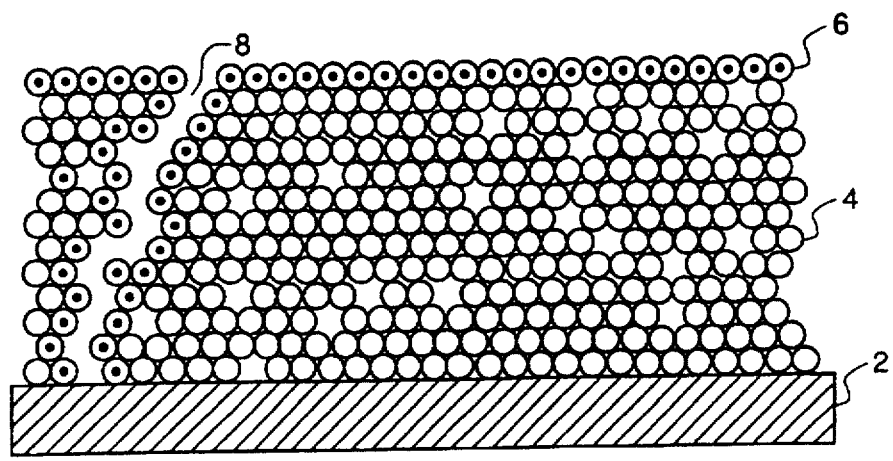
Figure 10B:
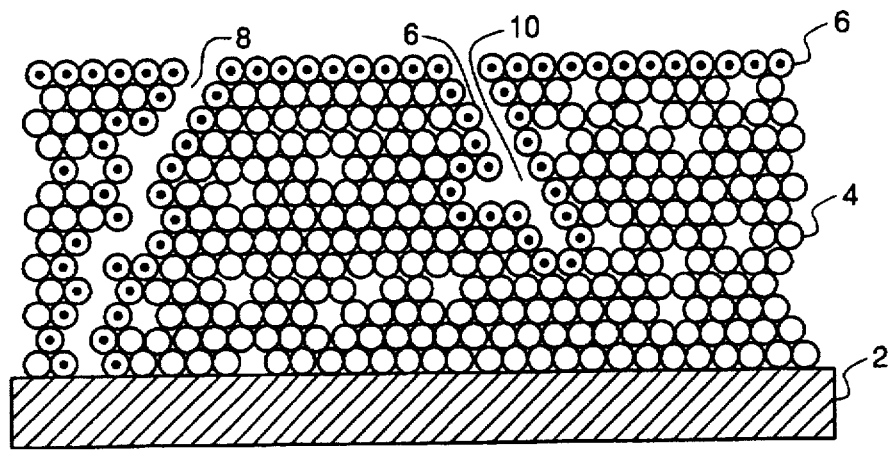
Figure 10C:
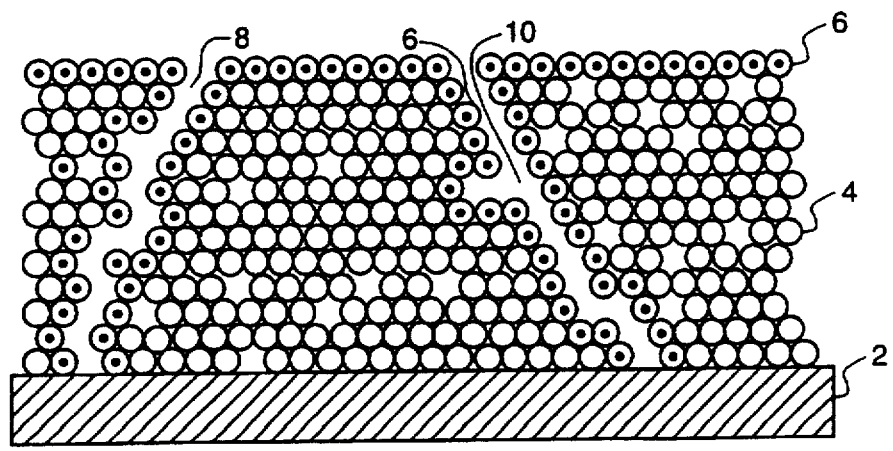

FIGS. 10A–C are schematic illustrations of a protective metal alloy coating having an insulating layer of the present invention, depicting a thermally sprayed zirconium alloy powder with a zirconia insulating layer and the protection afforded by the coating as a crack propagates through the coating.

Figure 11:
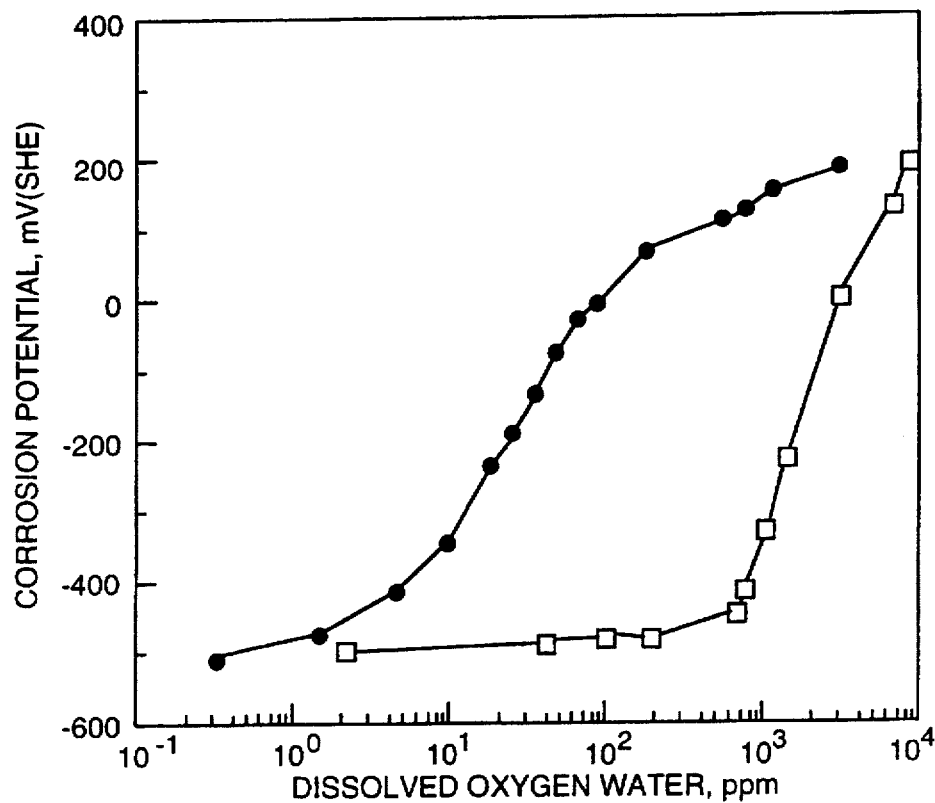
Figure 12:
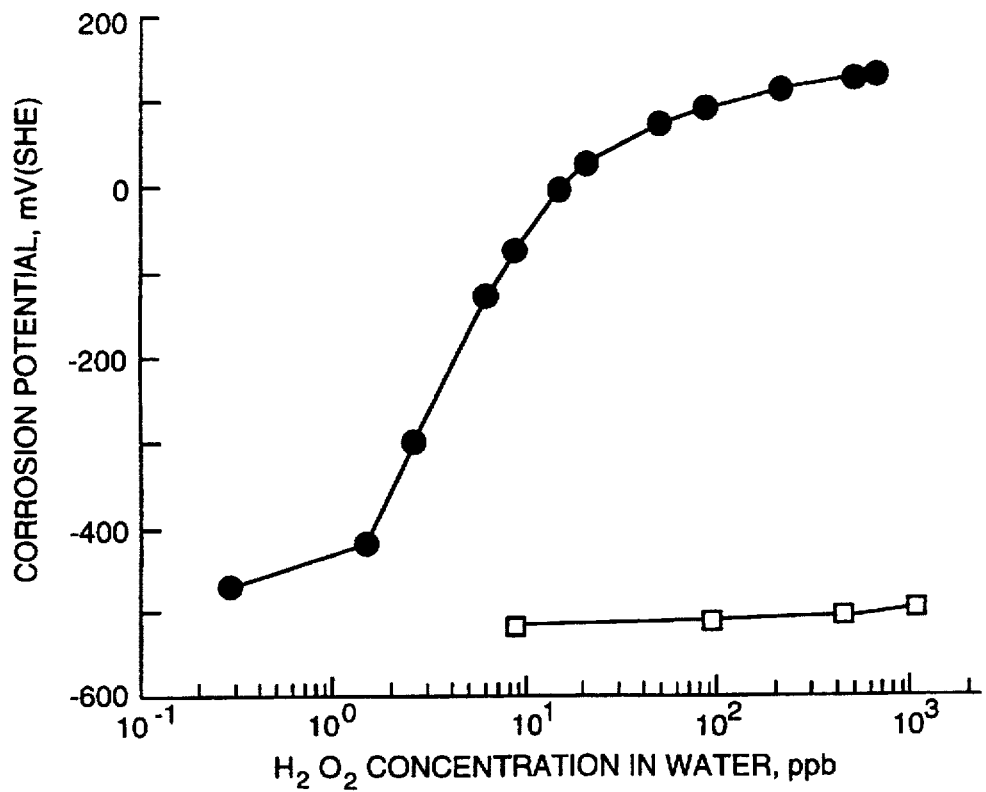

FIGS. 11 and 12 are plots showing the corrosion potential of Type 304 stainless steel uncoated (●) and coated (□) with yttria-stabilized zirconia by air plasma spraying versus oxygen and hydrogen peroxide concentration, respectively.

Figure 13:
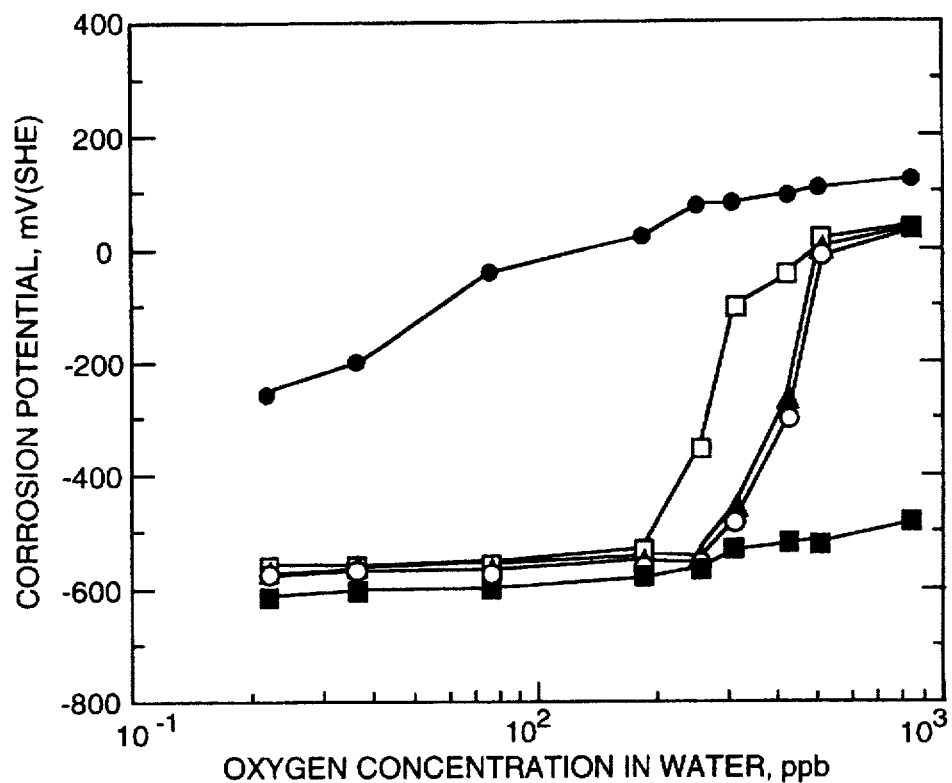
Figure 14:
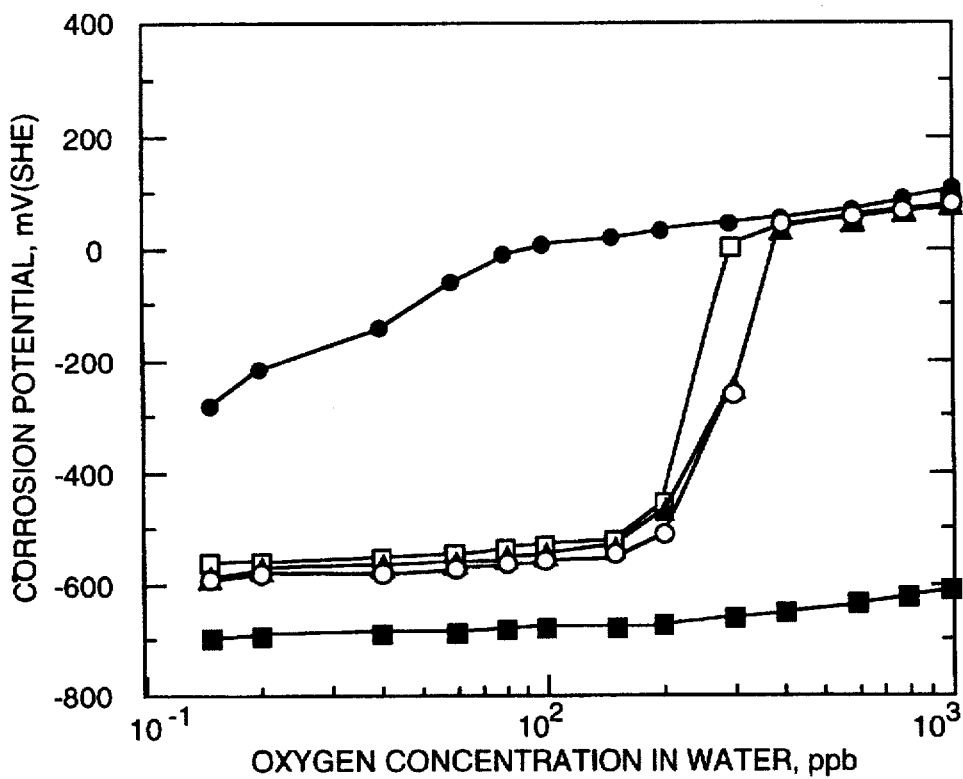

FIGS. 13 and 14 are plots showing the corrosion potential versus oxygen concentration for uncoated Type 304 stainless steel (●); Type 304 stainless steel coated with yttria-stabilized zirconia with thicknesses of 3 mils (□), 5 mils (▲) and 10 mils (○); and pure zirconium (■) after being immersed in pure water for 2 days and in water containing various water chemistry conditions for 3 months, respectively.

Figure 15:
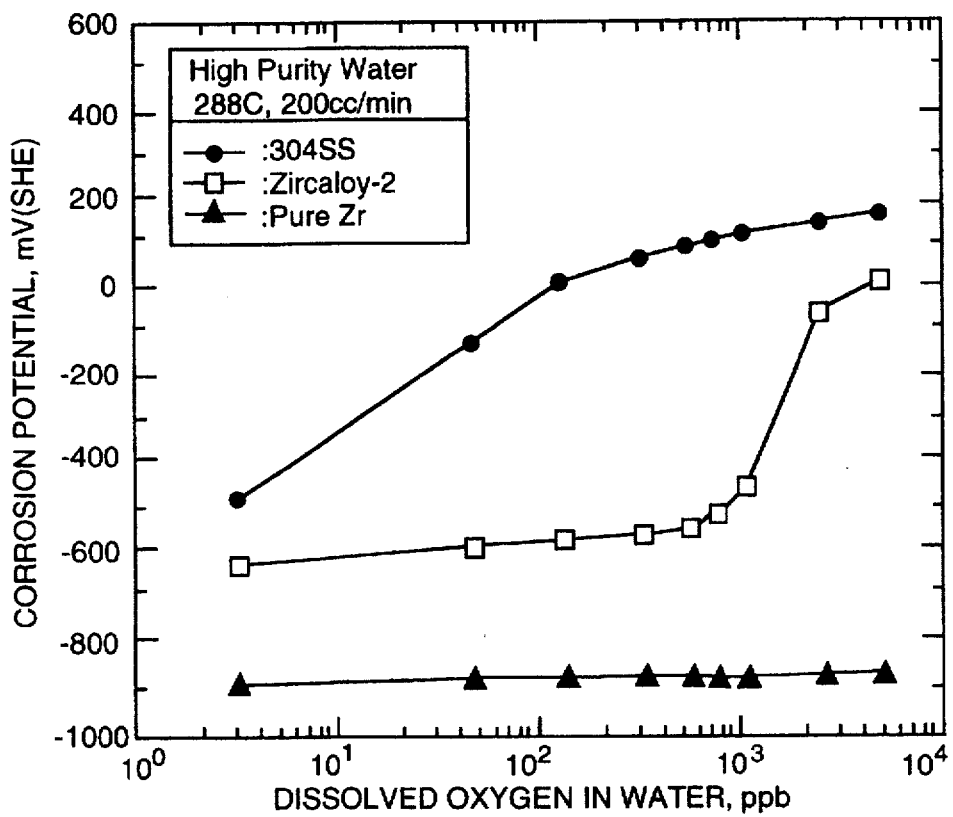

FIG. 15 is a plot showing the corrosion potential versus oxygen concentration for uncoated Type 304 stainless steel (●); Zircaloy-2 (□), and pure Zirconium (▲) in 288° C. water at an equivalent flow rate of 200 cc/min.

Figure 16:
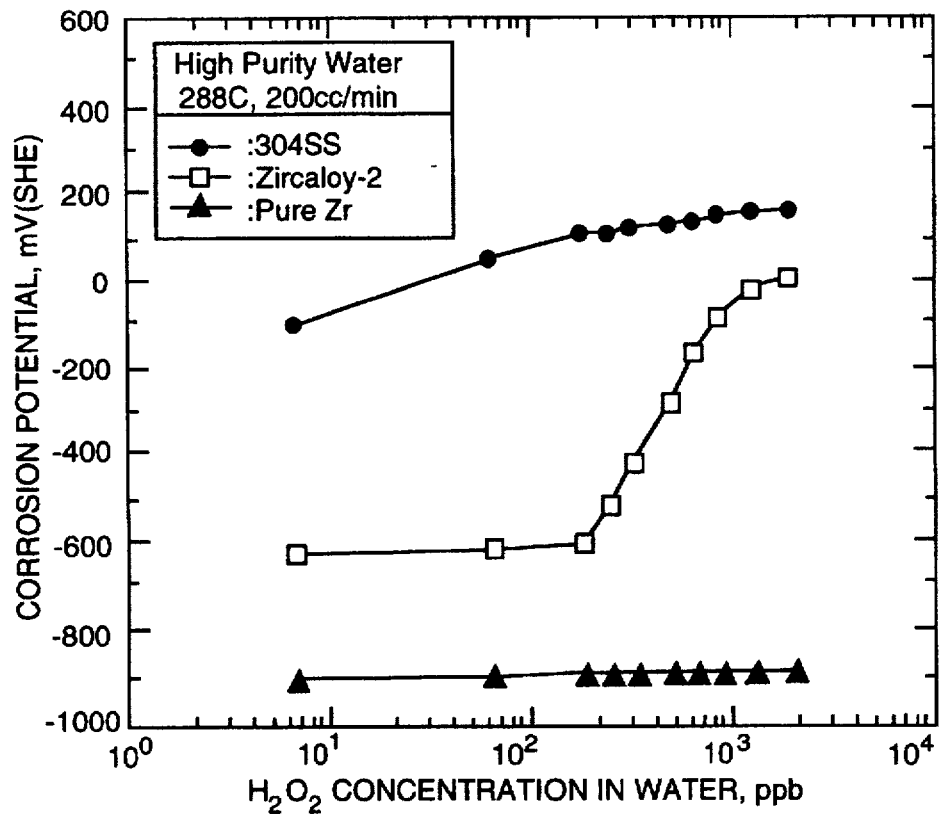

FIG. 16 is a plot showing the corrosion potential versus hydrogen peroxide concentration for uncoated Type 304 stainless steel (●); Zircaloy-2 (□), and pure Zirconium (▲) in 288° C. water at an equivalent flow rate of 200 cc/min.

DETAILED DESCRIPTION OF THE INVENTION

The present invention is a technique for solving the problem of achieving low corrosion potentials in the high-flux, in-core region (or in other regions which may have very high oxidant supply rates from high concentrations and/or high fluid flow rates/convection). The technique entails the formation of a metal alloy coating having an electrically insulating layer on SCC-susceptible surfaces of metal components of a water-cooled nuclear reactor. The insulating layer is designed to alter the balance between the rate of supply of oxidants to the surface and the rate of recombination on the surface by limiting the supply kinetics (by restricting the mass transport of reactants through the insulating layer). This invention is related to patent application Ser. No. 08/226,153 filed on Apr. 11, 1994, which is herein incorporated by reference. The technique of the present invention is based on the following fundamental considerations.

The first consideration is that corrosion potentials are created only at metal-water interfaces. Thus, while on a metal coating the corrosion potential is formed at the interface of the metal coating with the bulk water, on an insulating coating, the corrosion potential is formed at the interface of the substrate metal and the water with which it is in contact (i.e., the water in the pores, cracks or crevices, as described herein).

The influence of corrosion potential on stress corrosion cracking results from the difference in corrosion potential at the generally high potential crack mouth/free surface versus the always low potential (e.g., −0.5 V$_{SHE}$) within the crack/crevice tip. This potential difference causes electron flow in the metal and ionic flow in the solution, which induces an increase in the anion concentration in the crack, as in a classical crevice.

FIG. 8 is a schematic of electrochemical processes which generally lead to elevated corrosion potentials on the outside (mouth) of a crack and low corrosion potentials in the inside (tip) of the crack. The potential difference $\Delta\phi_c$ causes anions A⁻ (e.g., Cl⁻) to concentrate in the crack, but only if there is both an ionic path and an electron path.

FIGS. 9A to 9E provide a schematic comparison of the corrosion potentials $\phi_c$ which form under high radiation flux: (A) on an uncoated (e.g., stainless steel) component (high $\phi_c$); (B) on a component coated with a catalytic metal coating where the rate of supply of reactants to the surface is not too rapid (low $\phi_c$); (C) on a component coated with a catalytic metal coating where the rate of supply of reactants to the surface approaches or exceeds the recombination kinetics for H$_2$ and O$_2$ (moderate $\phi_c$); (D) on a component coated with an insulated protective coating (at a low corrosion potential provided that oxidant concentrations do not get too high, see FIG. 11); (E) on a component coated with an insulated protective coating that is doped with a noble metal (always at a low corrosion potential); and (F) on a component coated with a metal alloy coating having an insulating layer on an outer surface (always at a low corrosion potential).

Thus, to influence stress corrosion cracking, the elevated crack mouth corrosion potential must form on a surface that is in electrical contact with the component of interest. If a metal alloy coating having an insulating layer coating (see FIGS. 9 and 10) were applied to a metal component and some porosity, cracks or crevices in the coating are assumed to exist, the corrosion potential would be formed only at the metal component-water interface, so long as the metal alloy forms an insulating layer within the crack when it is formed or as it advances through the coating.

Thus, a crevice would be formed by the coating, but since it is electrically insulating, the crevice cannot represent an "electrochemical" crevice, but only a "restricted mass transport" geometry. The critical ingredient in "electrochemical" crevices is the presence of a conducting material in simultaneous contact with regions of high potential (e.g., a crack mouth) and regions of low potential (e.g., a crack tip). Thus, it would not help to have a component covered by a metal alloy layer (or interconnected metal particles) within which exists a series of interconnected pores, a crevice or crack, if an insulating layer is not formed within the interconnected pores, crack or crevice. Under these conditions, the aggressive crevice chemistry could form in the metal alloy layer, which in turn would be in contact with the component.

Therefore, metal alloy coatings of this invention are characterized by being insulating, adherent and insoluble in high temperature water. Insulating in this context means more insulating than the oxides that form on metal components used to contain high-temperature water, which are typically Fe-base, Ni-base and Co-base alloys, particularly stainless steels. These alloys form semi-conducting surface oxides that are known to be susceptible to electron transport through them. The electrical conductivity characteristics of the insulating layers formed on the metal alloys of this invention should be significantly lower than the outer oxide layer of the metal component, preferably at least two orders of magnitude lower, and more if possible. The insulating layer must be adherent, and thus not subject to spallation due to thermal cycling conditions that are typically experienced in high-temperature water systems. Finally, the insulating layer must be insoluble in high-temperature water, particularly when the water contains oxidizing species such as dissolved oxygen and/or hydrogen peroxide.

The second consideration is that if the insulating coating is impermeable to water, then obviously there can be neither a corrosion potential formed on the underlying metal, nor concern for stress corrosion cracking. Any pores, fine cracks or crevices in an insulating layer provide highly restricted mass transport and thus are equivalent to a very thick near-surface boundary layer of stagnant water. Since oxidants are always being consumed at metal surfaces, this very restricted mass transport (reduced rate of oxidant supply) causes the arrival rate of oxidants through the insulating coating to the substrate to decrease below the rate of their consumption. Under these mass transport limiting circumstances, the corrosion potential rapidly decreases to values $\leq -0.5$ $V_{SHE}$, even for high bulk oxidant concentrations, and even in the absence of stoichiometric excess hydrogen (or any hydrogen). Numerous observations consistent with this have been made, including low potentials on stainless steel surfaces at low oxygen levels (e.g., 1 to 10 ppb), as well as in (just inside) crevices/cracks, even at very high bulk oxygen levels.

Thus, corrosion potentials $\leq -0.5$ $V_{SHE}$ can be achieved using metal alloy coatings of the present invention, even at high bulk oxidant concentrations and, not only in the absence of stoichiometric excess hydrogen, but also in the absence of any hydrogen. This may prove to be a critical invention for BWR plants which are unable (because of cost or because of the high $N^{16}$ radiation levels from hydrogen addition) to add sufficient hydrogen to guarantee stoichiometric excess hydrogen conditions at all locations in their plant.

Metal alloys of the present invention may comprise any alloy that will self-passivate by forming an oxide in high-temperature water or air that meet the criteria described herein concerning the insulating layer. Self or spontaneous passivation is important because it is believed that small pores, cracks or crevices will occur in most metal alloy coatings, either immediately upon their deposition, or after prolonged exposure in a high-temperature water environment. These pores, cracks or crevices must form an insulating layer as described herein, otherwise they would be a potential source for crevice corrosion as described herein. Potentially suitable alloys for forming metal alloy coatings comprise Al-base, Sc-base, Y-base, La-base, Ti-base, Zr-base, HF-base, V-base, Nb-base or Ta-base alloys. Metal alloys in this context also include the pure forms of these metals. Zr-base alloys, such as Zircaloy-2, are preferred for nuclear reactor applications because of their known compatibility in nuclear reactor systems.

Various insulating layers may be formed on these metal alloy coatings, but Applicants believe that oxides, carbides, nitrides and borides of these alloys are most compatible with high-temperature water applications. In the case of zirconium alloys, the insulating layer could be an oxide of the alloy which would comprise zirconia. Zirconia ($ZrO_2$) is a good initial choice because it forms spontaneously in air or water, and it also may be applied by thermal spraying. Zirconia is also very stable in high-temperature water, both structurally (e.g., it is not prone to spalling and is not susceptible to environmentally assisted cracking) and chemically (e.g., it does not dissolve or react). Zirconia can also be obtained in various particle sizes, so that there is flexibility in adjusting the thermal spray parameters, where thermal spraying is the desired method of forming the insulating layer. Alumina is also an option. The dissolution rate of alumina in 288° C. water is higher than that for zirconia, but is still very low. Various other metal oxides, carbides, nitrides or carbides may also be suitable, so long as they are mechanically and chemically stable in a high temperature water environment, including not being subject to dissolution in high temperature water and not being subject to spalling under the normal operating condition of the high temperature water system. It should be noted that the insulating layer formed on the surface of the metal alloy coating may not be the same insulating layer (e.g. an oxide) that will form in pores, cracks or crevices as they are exposed to air or water.

Figure 1:
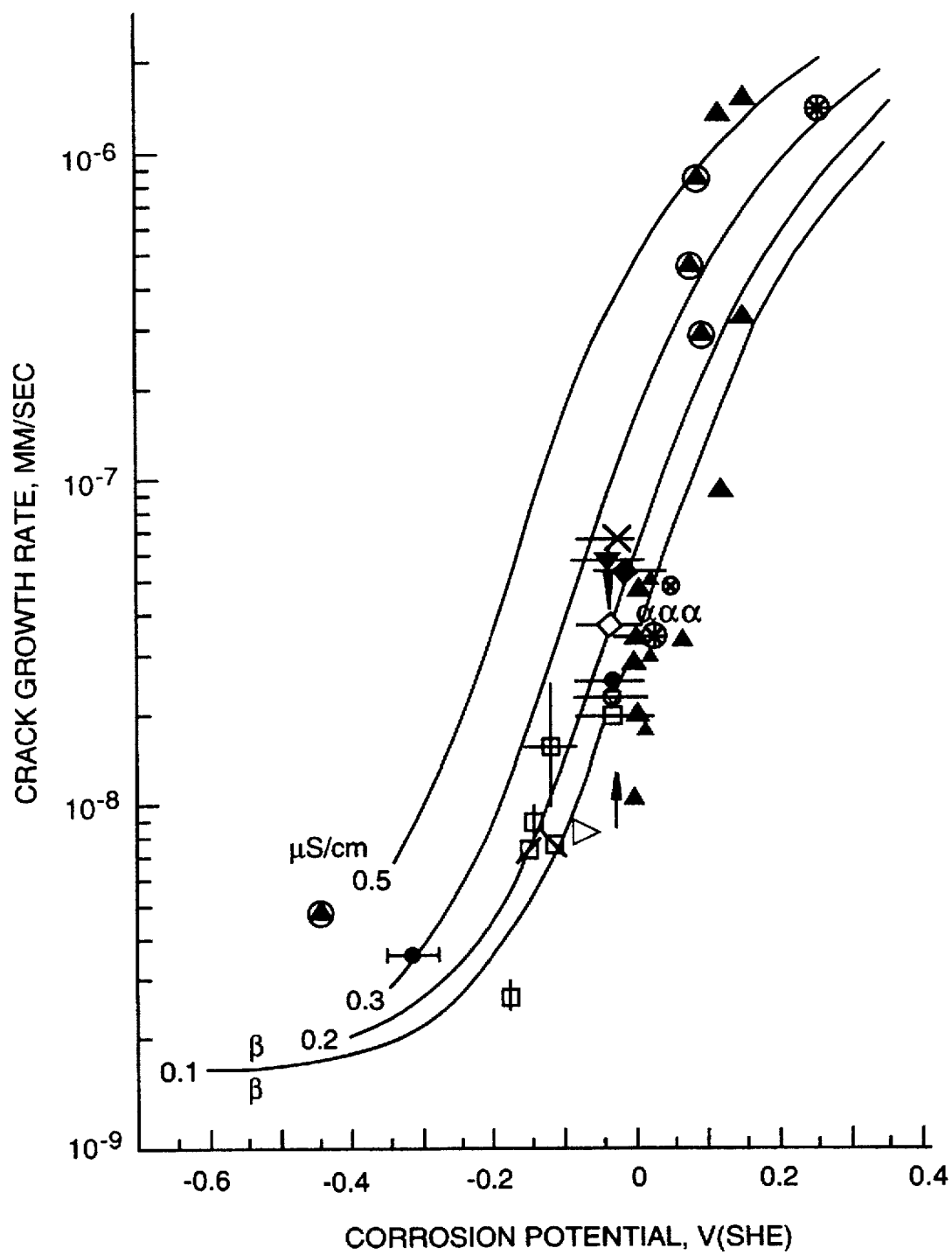
FIG. 1 shows the observed and predicted crack growth rate as a function of corrosion potential for furnace-sensitized Type 304 stainless steel in 288° C. water.
Figure 2:
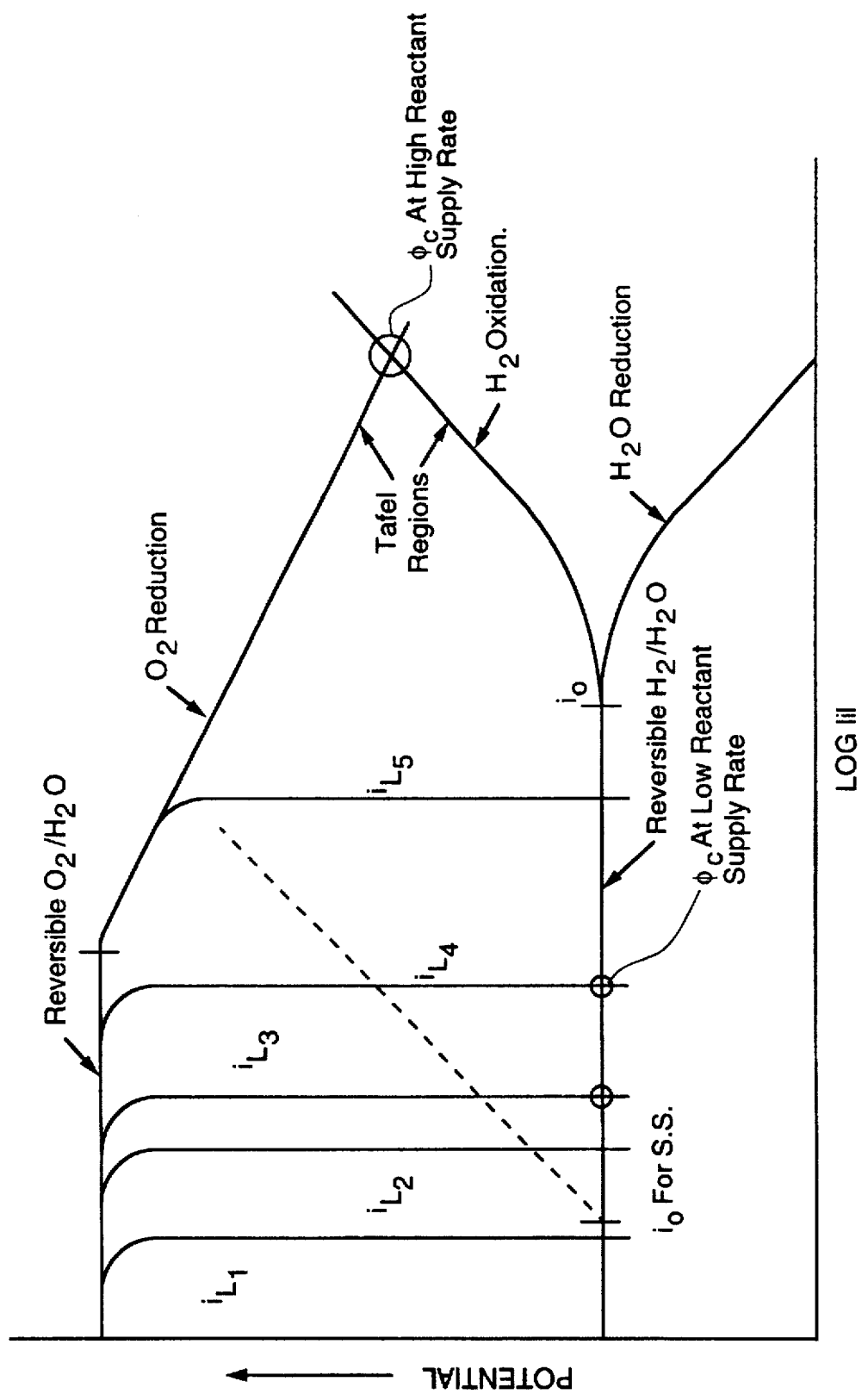
FIG. 2 is a schematic of E (potential) vs. log |i| (absolute value of current density) curves showing the interaction of $H_2$ and $O_2$ on a catalytically active surface such as platinum or palladium.
Figure 3:
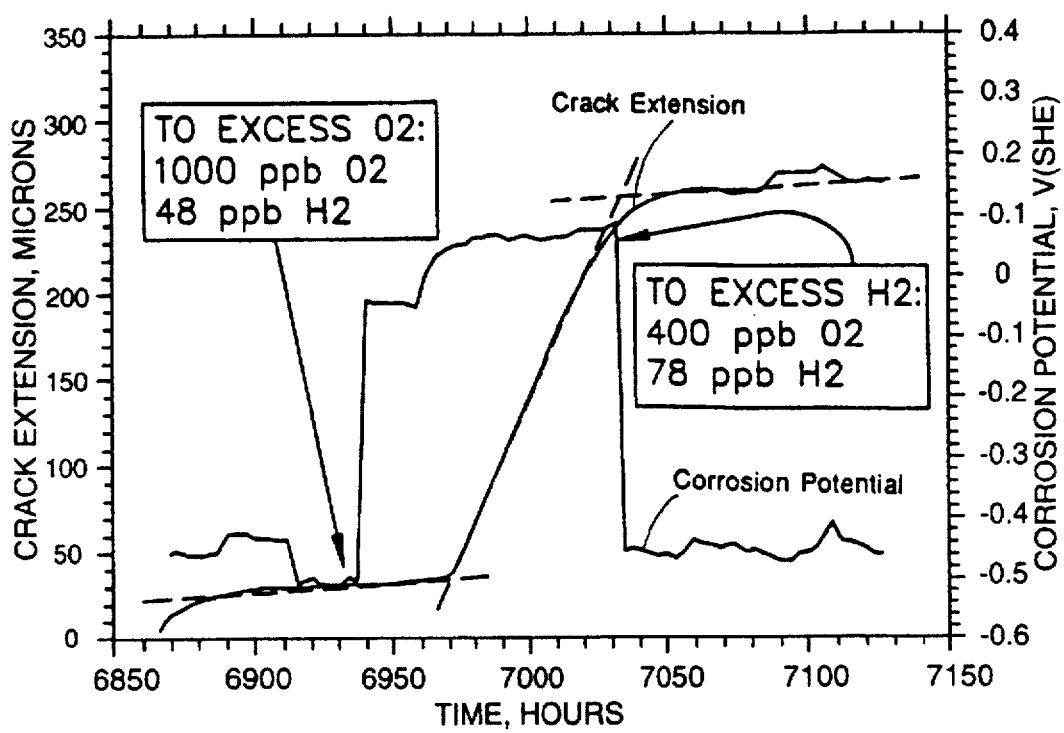
FIG. 3 is a plot of crack length vs. time for a Pd-coated CT specimen of sensitized Type 304 stainless steel in 288° C. water containing about 400 ppb oxygen and 0.1 μM $H_2SO_4$.
Figure 4:
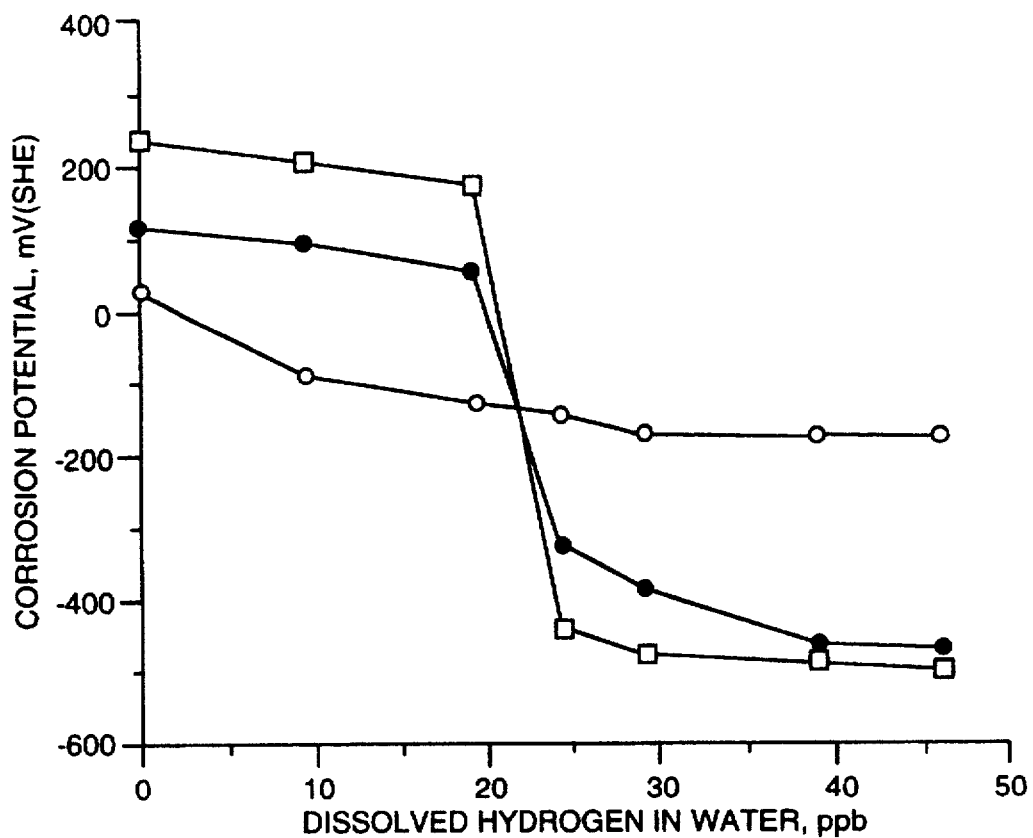
FIG. 4 is a graph showing corrosion potentials of pure platinum (□), Type 304 stainless steel (○) and Type 304 stainless steel thermally sprayed by the oxy-fuel (HVOF) technique with a powder of Type 308L stainless steel containing 0.1 wt. % palladium (●).
Figure 5:
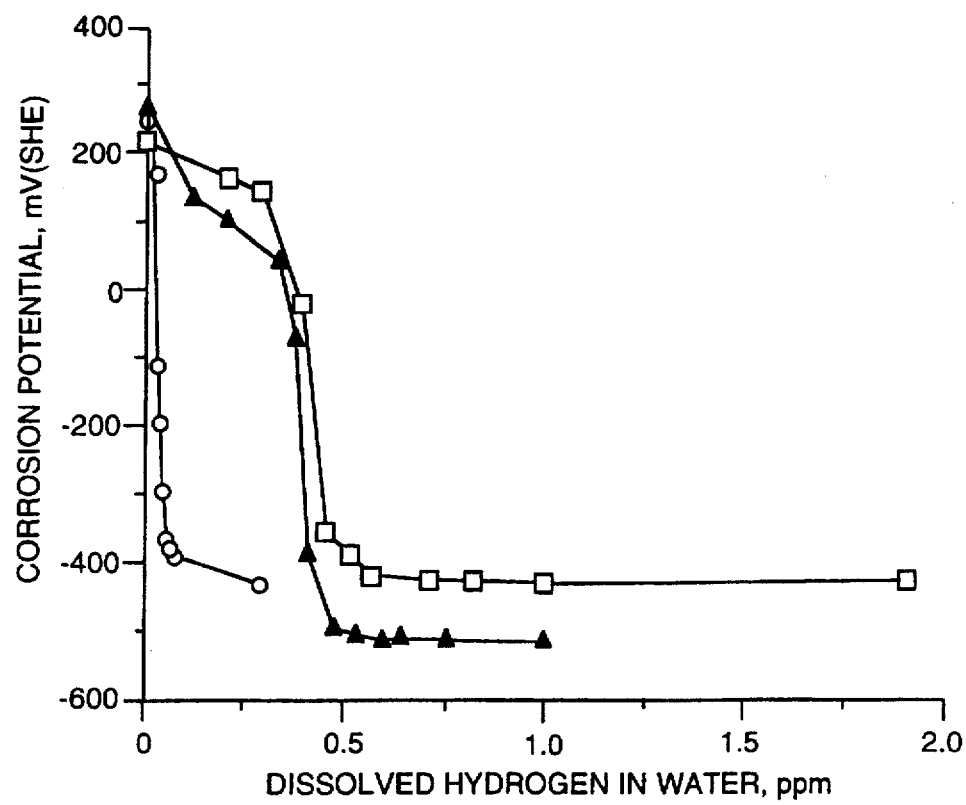
FIG. 5 is a graph showing corrosion potentials of Type 304 stainless steel doped with 0.35 wt. % palladium at a flow rate of 200 cc/min. in 288° C. water containing various amounts of hydrogen and the following amounts of oxygen: (●) 350 ppb; (▲) 2.5 ppm; and (□) 5.0 ppm.
Figure 6:
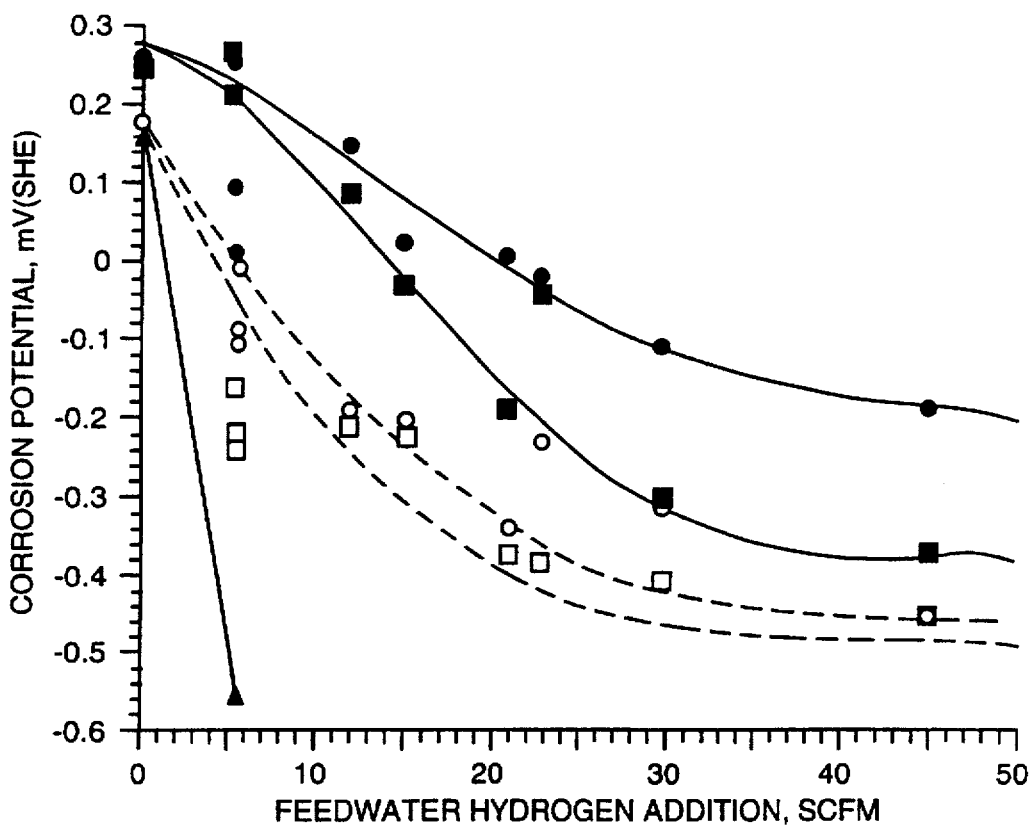
FIG. 6 is a graph showing the effect of feedwater hydrogen addition on the corrosion potential of Type 304 stainless steel at the top of the core (●), at the bottom of the core (■), and in the recirculation piping (▲); and of platinum at the top (○) and bottom (□) of the core.

FIG. 10A is a schematic illustration of a metal alloy coating of the present invention having an insulating layer, depicted as particles 4 of zirconium powder which have been thermally sprayed onto metal component surface 2. The particles at the surface are oxidized particles 6, which may be oxidized as described herein, and thus comprise the insulating layer. Crack 8 existing immediately after deposition is also shown. This crack also has oxidized particles 6 on the crack surface upon exposure to an oxidizing environment. Due to the insulating nature of zirconia, there is no electrical connection between external (high oxidant) water and metal component substrate 2. Thus, the insulating layer prevents an electrochemical crevice cell from being formed (see FIG. 8). FIGS. 10B and 10C illustrate how a crack or crevice may progress through the metal alloy coating. As the crack/crevice tip is opened in the presence of an oxidant (e.g. high-temperature water with dissolved oxygen or air) the particles 4 form oxidized particles 6 such that the crack is self passivating until it reaches the metal substrate 2 (FIG. 10C). Upon reaching metal substrate 2, the crack or crevice 10 restricts the mass transport of oxidants to the underlying metal substrate 2 (see FIGS. 2 and 7) to sufficiently low rates such that the corrosion potential of the metal component is always low (i.e., $-0.5$ $V_{SHE}$)

Experimental data (shown in FIG. 11) were obtained in 288° C. pure water on a cylindrical stainless steel electrode coated with yttria-stabilized zirconia (YSZ) by air plasma spraying. A $Cu/Cu_2O$ membrane reference electrode was used to measure the corrosion potentials of the stainless steel autoclave, a platinum wire and the YSZ-coated stainless steel specimen. At oxygen concentrations up to $\approx 1$ ppm (during BWR operation, the equivalent oxygen concentration ($O_2 + 0.5 \times H_2O_2$) is about 100 to 600 ppb), the corrosion potential of the YSZ-coated specimen remained at $\leq -0.5$ $V_{SHE}$ despite the high potentials registered on the stainless steel autoclave (+0.20 $V_{SHE}$) and the platinum electrode (+0.275 $V_{SHE}$). This is consistent with numerous observations of low potentials on stainless steel surfaces at low oxygen levels (e.g., 1 to 10 ppb) as well as inside crevices/cracks, even at very high oxygen levels. Applicant's believe that these results will be similar to those expected for metal alloy coatings of the present invention where zirconia is the insulating layer, because the insulating material is the same in both cases. However, the zirconia insulating layers of the present invention may have even more restricted mass transport and correspondingly lower corrosion potentials if a less porous insulating oxide layer is formed (e.g. oxide layers formed in situ).

Similar observations were obtained in hydrogen peroxide, where low potentials were observed on the YSZ-coated specimen at concentrations above 1 ppm (see FIG. 12). By contrast, uncoated stainless steel exhibited a high corrosion potential of ≈+0.150 $V_{SHE}$. Low potentials were also observed on the YSZ-coated specimen in water containing 1 ppm $O_2$ when the specimen was rotated at 500 rpm, corresponding to 0.7 m/sec linear flow rate. This is not surprising, since the higher flow rates merely act to reduce the thickness of the stagnant boundary layer of liquid, a layer whose thickness is small relative to the zirconia coating. The success in maintaining low corrosion potentials under these conditions shows that the electrically insulating zirconia layer greatly reduces mass transport to the underlying metal surface such that, even in the absence of catalytic agents such as palladium, the cathodic (oxygen reduction) reaction is mass transport limited just as in uncoated specimens in solutions of very low dissolved oxygen content. Applicants also believe these results to be applicable to metal alloy coatings of the present invention for the reasons described pertaining to the results of FIG. 11.

Further corroboration for metal alloys of the present invention exists in the corrosion potential measurements on Zircaloy in 288° C. water, which apparently are always lower than −0.5 $V_{SHE}$, even in aerated solutions. The relatively highly electrically insulating nature of the zirconia film causes the corrosion potential to be formed at the metal surface where the oxidant concentration is very low due to its restricted transport through the zirconia film.

Additional experimental data is presented in FIGS. 13 and 14. A coating made of yttria-stabilized zirconia powder was deposited in three different thicknesses (3, 5 and 10 mils) on the fresh metal surface of Type 304 stainless steel (0.25 inches in diameter and 1 inch long) by air plasma spraying. The corrosion potentials of the zirconia-coated electrodes, a pure zirconium electrode and uncoated Type 304 stainless steel were measured against a $Cu/Cu_2O/ZrO_2$ reference electrode in 288° C. water containing various amounts of oxygen. After the corrosion potential measurement, test specimens were immersed in 288° C. water containing various water chemistry conditions for 3 months at open circuit.

In the initial tests, YSZ-coated stainless steel electrodes were mounted in the autoclave along with a zirconium electrode, an uncoated Type 304 stainless steel electrode and the reference electrode. All specimens were immersed in pure 288° C. water at a flow rate of 200 cc/min for 2 days. The corrosion potential was measured sequentially with incremental addition of oxygen, as shown in FIG. 13. At given oxygen levels up to 200–300 ppb, the YSZ-coated electrodes showed low potentials (<−0.5 $V_{SHE}$) essentially equivalent to those of the pure zirconium electrode, compared to the Type 304 stainless steel corrosion potential values measured at the same level of oxygen. Further increase of the oxygen concentration increased the corrosion potential of the YSZ-coated electrodes.

After the system was left in 288° C. water containing various water chemistry conditions for 3 months, the corrosion potential was again measured by increasing the oxygen concentration (see FIG. 14). This data indicates that the corrosion potential behavior of the YSZ-coated electrodes was retained for extended periods.

From the foregoing data in FIGS. 13 and 14, it is apparent that the application of a YSZ coating on the surface of Type 304 stainless steel appears to be advantageous in maintaining a low corrosion potential (<−0.5 $V_{SHE}$) at high oxygen levels (up to about 300 ppb), even in the absence of hydrogen, by reducing mass transfer of oxygen to the metal surface and thereby mitigating SCC of the structural material. Since the oxygen concentration during operation of a BWR is about 200 ppb, SCC in BWR structural components could be mitigated by the application of a YSZ coating or any other electrically insulating protective coating on the surfaces of the structural material. Again, this is analogous to metal alloy coatings of the present invention, particularly those that have cracks or crevices extending through the metal alloy coating to the surface of the metal component, and more particularly when the insulating layer comprises zirconia.

As further corroboration, FIGS. 15 and 16 show the corrosion potential of coupons of type 304 stainless steel, Zircaloy-2 (a well-known commercial zirconium alloy having about 1.2–1.7%Sn, 0.13–0.20% Fe, 0.06–0.15%Cr, 0.05–0.08% Ni, 0.09–0.15% O and a balance of Zr, by weight) and pure zirconium in high temperature water containing dissolved oxygen and hydrogen peroxide, respectively. These measurements of corrosion potential were made similarly to those made for the data of FIGS. 13 and 14, except that the same samples were measured over a period of several weeks at different oxidant concentrations. Except at very high oxidant concentrations, Zircaloy-2 and pure zirconium have significantly lower corrosion potentials (≤−0.500V) than type 304 stainless steel. Therefore, metal alloy coatings of the present invention are also expected to also exhibit similarly lowered corrosion potentials, particularly in the case where zirconium alloys or pure zirconium comprise the metal alloy coating.

Metal alloy coatings of the present invention may be of any suitable thickness, however, they are expected to be on the order of 20 mils or less for most applications. The insulating layers formed on the metal alloy coating can be much thinner, on the order of 1 micron, so long as they satisfy the criteria set forth herein.

Metal alloy coatings of the present invention have advantage over insulating coatings in that they will typically be less brittle, and more likely to adhere well to the metal substrate. Also, such coating will also typically be able to be deposited at lower temperatures than insulating coatings due to their lower melting points.

Metal alloy coatings of this invention may be applied using methods that are compatible with the metal components or substrate, including known methods such as thermal spraying or cladding. They may be applied on a component prior to its incorporation into a high-temperature water system, or after incorporation into such a system, and may also be applied with water in the system using known techniques, such as plasma spray.

The insulating layer may be formed in air, water or other oxidizing medium in the case of oxide insulating layers, other well-known methods may be employed to form nitrides, carbides or borides.

The present invention is particularly suited for use in water-cooled nuclear reactors that contain high-temperature water, however, the invention may also be utilized in any other systems that utilize high-temperature water where SCC is a consideration, such as conventional turbines and generators.

The foregoing method has been disclosed for the purpose of illustration. Variations and modifications of the disclosed method will be readily apparent to practitioners skilled in the art of water chemistry. All such variations and modifications are intended to be encompassed by the claims set forth hereinafter.

What is claimed is:

1. A method for mitigating stress corrosion cracking of a metal component adapted for use in high temperature water, comprising the steps of:

selecting a metal component having a surface and adapted for use in a system where the surface is exposed to high temperature water, wherein the surface has a corrosion potential and is susceptible to stress corrosion cracking when exposed to high-temperature water;

applying a coating of a metal alloy to the surface of the metal component; and self-passivatingly forming an insulating layer on an outer surface of the metal alloy that is adherent and insoluble in high temperature water, whereby the metal component with the insulating layer has a corrosion potential that is at least 0.050 V lower than the corrosion potential of the surface of the metal component in high temperature water.

2. The method of claim 1, wherein said steps of selecting, applying a coating and forming an insulating layer are done prior to a further step of incorporating the metal component into a system.

3. The method of claim 1, wherein said steps of selecting, applying a coating and forming an insulating layer are done after a further step of incorporating the metal component into a system.

4. The method of claim 3, wherein said steps of selecting, applying a coating and forming an insulating layer are done after a further step comprising placing water into the system and in contact with the metal component.

5. The method of claim 1, wherein the metal component comprises a Fe-base, Ni-base or Co-base alloy.

6. The method of claim 1, wherein the metal alloy is a Al-base, Sc-base, Y-base, La-base, Ti-base, Zr-base, Hf-base, V-base, Nb-base, or Ta-base alloy.

7. The method of claim 1, wherein the insulating layer comprises an oxide, nitride, carbide or boride of the metal alloy.

8. The method of claim 1, wherein the step of applying the coating comprises spray forming.

9. The method of claim 1, wherein the step of applying the coating comprises cladding the metal alloy to the surface of the metal component.

10. The method of claim 1, wherein the corrosion potential of the metal component with the insulating layer in high temperature water is below a critical potential at which stress corrosion cracking of the metal component occurs.

11. The method of claim 1, further comprising a plurality of restricted mass transport crevices in the coating which extend through the insulating layer to the surface of the metal component and which restrict the flow of oxidants to the surface, whereby the metal component with the insulating layer and the plurality of mass transport crevices has a corrosion potential that is at least 0.050 V lower than the corrosion potential of the surface of the uncoated metal component in high temperature water.

12. A method for mitigating stress corrosion cracking of a surface of a metal component in a water-cooled nuclear reactor, the surface being exposed to high temperature water and having a corrosion potential that makes it susceptible to stress corrosion cracking in the high temperature water, comprising the steps of:

applying a coating of a metal alloy to the surface of the metal component; and self-passivatingly forming an insulating layer on an outer surface of the metal alloy that is adherent and insoluble in high temperature water, whereby the metal component with the insulating layer has a corrosion potential that is at least 0.050 V lower than the corrosion potential of the surface of the metal component in high temperature water.

13. The method of claim 12, wherein hydrogen is added to the feedwater of the nuclear reactor during reactor operation.

14. The method of claim 12, wherein the corrosion potential of the metal component with the insulating layer in high temperature water is below a critical potential at which stress corrosion cracking of the metal component occurs.

15. The method of claim 12, further comprising a plurality of restricted mass transport crevices in the coating which extend through the insulating layer to the surface of the metal component and which restrict the flow of oxidants to the surface, whereby the metal component with the insulating layer and the plurality of mass transport crevices has a corrosion potential that is at least 0.050 V lower than the corrosion potential of the surface of the uncoated metal component in high temperature water.

16. A component of a water-cooled nuclear reactor or associated equipment, comprising:

a metal substrate having a surface which has a corrosion potential and is susceptible to stress corrosion cracking in high-temperature water; and a metal alloy coating on the surface of said metal substrate, said metal alloy coating comprising an outer electrically and self-passivating insulating layer that is adherent and insoluble in high temperature water, whereby the coated metal substrate has a corrosion potential in high temperature water that is at least 0.050 V lower than the corrosion potential of the surface of said metal substrate.

17. The component of claim 16, wherein said metal substrate comprises a Fe-base, Ni-base or Co-base alloy.

18. The component of claim 16, wherein said metal alloy coating is a Al-base, Sc-base, Y-base, La-base, Ti-base, Zr-base, Hf-base, V-base, Nb-base, or Ta-base alloy.

19. The component of claim 16, wherein said electrically insulating layer comprises an oxide, nitride, carbide or boride of the metal alloy coating.

20. The component of claim 19, wherein the electrically insulating layer comprises zirconia.

21. The component of claim 20, wherein the zirconia is stabilized with yttria.

22. The component of claim 19, wherein said electrically insulating layer comprises alumina.

23. The component of claim 16, wherein the coated metal substrate has a corrosion potential in high temperature water that is below a critical potential at which stress corrosion cracking of the metal component occurs.

24. The component of claim 16, further comprising a plurality of restricted mass transport crevices in the coating which extend through the insulating layer to the surface of said metal substrate and which restrict the flow of oxidants to the surface, whereby the coated metal substrate with the plurality of crevices has a corrosion potential that is at least 0.050 V lower than the corrosion potential of the surface of the metal component in high temperature water.

25. A water-cooled nuclear reactor comprising metal components which are susceptible to stress corrosion cracking during reactor operation and which have been treated to mitigate said stress corrosion cracking, each of said metal components comprising:

a metal substrate having a surface which has a corrosion potential and is susceptible to stress corrosion cracking in high-temperature water; and a metal alloy coating on the surface of said metal substrate, said metal alloy coating comprising an outer electrically and self-passivating layer that is adherent and insoluble in high temperature water, whereby the coated metal substrate has a corrosion potential in high temperature water that is at least 0.050 V lower than the corrosion potential of the surface of said metal substrate.

* * * * *